W. W. SHORDAY.
LOCKING BLOCK.
APPLICATION FILED JUNE 25, 1919.

1,317,329.

Patented Sept. 30, 1919.

UNITED STATES PATENT OFFICE.

WALTER W. SHORDAY, OF NORTH PHILADELPHIA, PENNSYLVANIA, ASSIGNOR OF ONE-HALF TO HOWARD M. FRETZ, OF PHILADELPHIA, PENNSYLVANIA.

LOCKING-BLOCK.

1,317,329.      Specification of Letters Patent.      Patented Sept. 30, 1919.

Application filed June 25, 1919. Serial No. 306,641.

*To all whom it may concern:*

Be it known that I, WALTER W. SHORDAY, a citizen of the United States, residing at North Philadelphia, in the county of Philadelphia and State of Pennsylvania, have invented certain new and useful Improvements in Locking-Blocks, of which the following is a specification.

My invention relates to improvements in locking blocks.

The objects of my invention are to provide a device of the class described that is portable, compact, efficient in operation and inexpensive to manufacture, one that may be used in connection with any wheeled vehicle, automobile, aeroplane and the like and one which when not in use may be carried on the vehicle, automobile, &c., or in a tool box thereon.

With these and other objects in view my device consists in the new and novel construction, combination and arrangement of parts hereinafter described and claimed and illustrated in the accompanying drawings, wherein:—

Like parts are referred to by like reference characters throughout the drawings.

Figure 1:
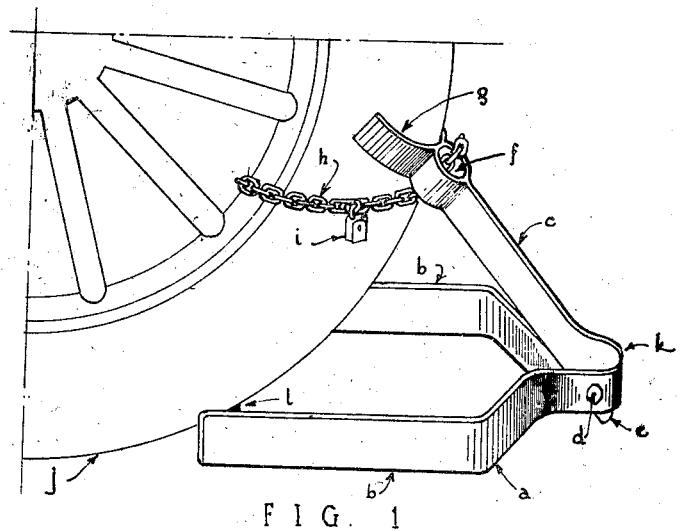
Figure 1 is a perspective view of the device in operative position on the tread of an automobile tire.
Figure 2:
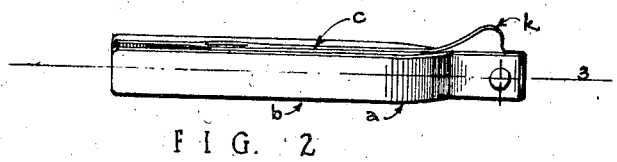
Fig. 2 is a side view of the device folded when not in use.
Figure 3:
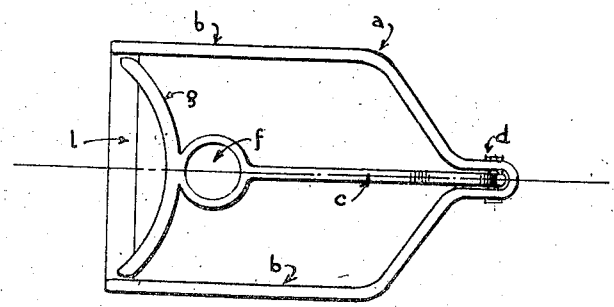
Fig. 3 is a transverse sectional view taken on the line 3—3 of Fig. 2.

Referring to the drawings in detail the reference character $a$ denotes the base of the locking block as an entirety, the same being cast in one piece and preferably of cast iron. A practical working block measuring about $6\frac{1}{4}"x5"$, over all.

Said block $a$ comprises the transversely extending parallel arms $b$ constructed in the form of a yoke, connected at their extremities by the cross arm $l$ integral therewith.

Said parallel arms $b$ at their opposite extremities are brought closer together to form the head of said yoke, as particularly illustrated in Fig. 1.

The space between the parallel arms $b$ at the contacting ends is of sufficient width to accommodate the tread of the wheel to be blocked, illustrated in the drawings as an automobile wheel $j$ and the cross arm $l$ is cupped or beveled to effectually hold said wheel therein and to preclude said wheel $j$ from riding thereover.

An arm $c$ is pivotally secured between the parallel arms $b$ as indicated at $d$ and terminates in the gripper or semi-circular member $g$ adapted to engage the tread of the said wheel $j$. An opening $f$ is provided in said arm $c$ for the passing therethrough of a chain $h$. This chain $h$ is generally used to lock the wheel to prevent theft and it encircles the tread of the wheel $j$ being secured in place by means of the lock $i$.

The said arm $c$ is provided with the overlapping portion $k$ as illustrated and has the projecting portion $e$ extending below the base of the parallel arms $b$ when said arm $c$ is in its extended position.

In operation: The device is placed in position, the tread of the wheel to be blocked contacting against the cupped cross arm $l$ and the arms $b$ contacting against the sides of said tread. The arm $c$ is then elevated and also brought into contact with said tread. As said arm $c$ is elevated the projection $e$ will engage the earth or other substance upon which the block is resting, providing a firm support for the block.

The many advantages of this device will be obvious. When in position the wheel that it is blocking may be turned at any angle, as the block will follow or turn with the wheel. In case of fire the locking block can be picked up with the hand from its blocking position without the necessity of unlocking block as it will carry with each rotation of the wheel without interference therewith. When jacking up an automobile to change a tire on a grade, or on the level the device is very useful in preventing the automobile from running off the jack. It is necessary to release the emergency brake on an automobile when changing a rear tire or taking off a rear wheel; if the automobile is not blocked in some manner it will run off the jack, causing considerable damage to the machinery and may result in injury to the occupants of the car. When starting or cranking a Ford car it has a tendency to move forward when the motor starts. The present device will prevent this movement if placed under the front wheel. Serious accidents have resulted from this cause in many instances—also damage has been caused when the car lurches forward in a garage or place where other cars are being assembled. In testing aeroplane motors when the plane is standing on the ground a block under the wheels is absolutely necessary to hold the 'plane down. The present device answers this purpose.

When not in use the device can be folded and can be carried with but slight inconvenience as it occupies but a small space.

Having thus described my invention what I claim as new and desire to secure by Letters Patent is:

1. A device of the class described, comprising a yoke, a cross arm, cupped to engage the tread of a wheel, connecting the arms thereof, and an arm pivotally secured in the head of said yoke terminating in a member adapted to engage the tread of said wheel at a point in advance of the arms of said yoke, said arm at its pivoted end having a projection adapted to engage the surface on which the device rests.

2. A device of the class described, cast in one piece, comprising a yoke, a cross arm, cupped to engage the tread of a wheel, connecting the arms thereof, and an arm pivotally secured in the head of said yoke terminating in a member adapted to engage the tread of said wheel at a point in advance of the arms of said yoke, said arm at its pivoted end having a projection adapted to engage the surface on which the device rests and means for locking the device in operative position.

In testimony whereof I affix my signature.

WALTER W. SHORDAY.